Feb. 14, 1961  C. W. LINCOLN  2,971,787
BALL JOINT ASSEMBLY
Filed Oct. 29, 1956
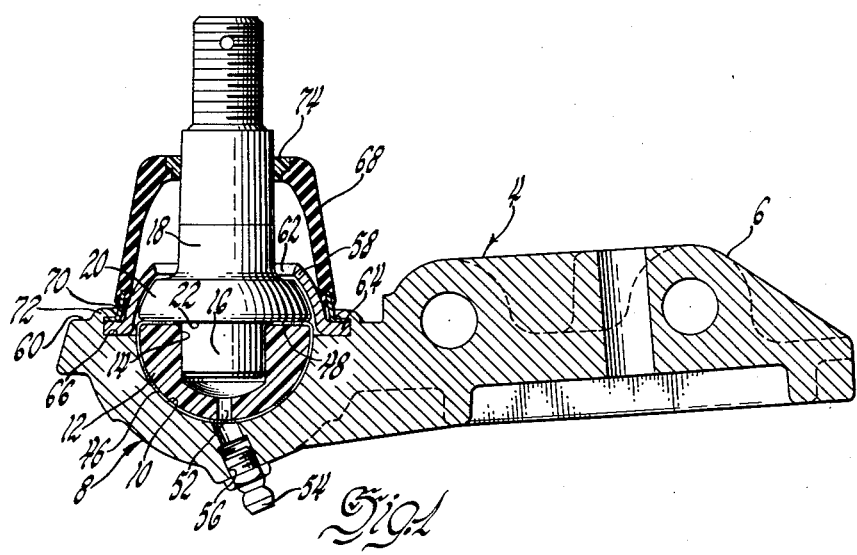
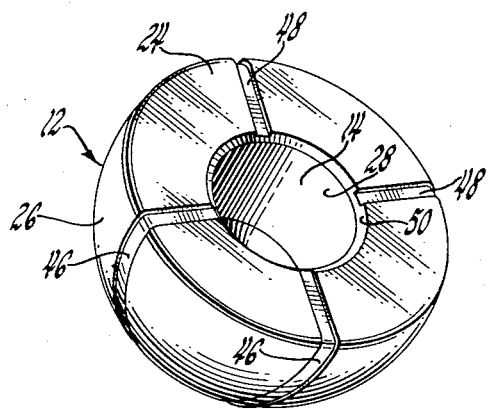
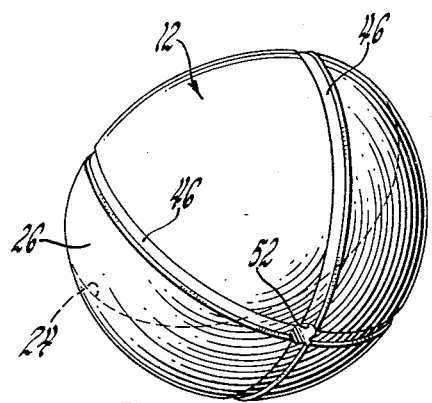
INVENTOR.
Clovis W. Lincoln
BY
W. S. Pettigrew
ATTORNEY.

United States Patent Office 2,971,787
Patented Feb. 14, 1961

2,971,787

BALL JOINT ASSEMBLY

Clovis W. Lincoln, Saginaw, Mich., assignor to General Motors Corporation, Detroit, Mich., a corporation of Delaware Filed Oct. 29, 1956, Ser. No. 619,018

6 Claims. (Cl. 287—90)

This invention relates to joint construction and more particularly to ball and socket assemblies.

Until quite recently, it was common practice to fabricate ball and socket joints wherein one of the elements was case hardened and the other left in an unhardened state. More recently, bearing liners of porous metal, plastic and other low friction materials have been employed with increasing frequency. Phenolic resins have proved particularly suitable for this purpose. In the typical case, preformed phenolic resin impregnated liners are physically bonded to the internal wall of the socket to provide a low friction bearing surface engaging the cooperating ball end of the ball stud. While this form of ball and socket joint has proved efficient in operation, fabrication is relatively complicated and expensive.

An object of the present invention is to provide an improved ball joint assembly.

Another object is to provide a ball joint assembly in which a phenolic bearing element is retained in operating position entirely by assembled relation of the parts.

A further object is to provide a ball joint assembly utilizing a truncated phenolic ball which is rotatable relative to the joint stud and tiltable relative to the joint socket.

A still further object is to provide a ball and socket assembly of the type described including a novel and simplified seal construction.

These and other objects, advantages and features of the invention will become more fully apparent as reference is had to the accompanying drawings wherein:

Fig. 1 is an elevational view, partly in section, illustrating the form and construction of the invention.

Fig. 2 is an enlarged perspective view of the phenolic hemispherical bearing element of the present invention; and Fig. 3 is a second enlarged perspective view of the element illustrated in Fig. 2.

Referring now to the drawings and particularly Fig. 1, there is illustrated a ball and socket assembly of the type adapted for use in conjunction with the load carrying wishbone arm of an independent suspension for vehicles. The assembly includes a forged member 4 having an arm portion 6 adapted for attachment to the vehicle suspension wishbone arm, not shown. At its outer end, member 4 is formed with a hemispherical housing 8 having an upwardly facing inner spherical surface which is ground or otherwise accurately finished to provide a socket 10. Disposed in and closely interfitting socket 10 is a truncated non-metallic ball 12.

In accordance with one feature of the invention, ball 12 is preferably a preformed and cured body fabricated from phenol formaldehyde resin impregnated fabric. As seen in Figs. 1 and 2, ball 12 is provided with a central vertically directed cylindrical depression 14 which is adapted to receive the stub end 16 of a ball stud element 18. Axially adjacent stub end 16 ball stud 18 is formed with an integral flange 20 having a flat circular shoulder 22 adapted for axial abutting relation with the flat circular upper wall 24 of truncated ball 12. The outer periphery of flange 20 is frusto-spherical in profile and forms a continuation of truncated ball 12.

In accordance with another feature of the invention, the semi-spherical outer surface 26 of phenolic ball 12 is provided with a pair of hemi-circumferential grooves 46 which are coextensive with four radially extending grooves 48 on the top wall 24 thereof. The radially inner ends of grooves 48 terminate at a chamfer 50 formed at the juncture of wall 24 and cylindrical depression 14. At the intersection of grooves 46, a small radial passage 52 communicates directly with the bottom of cylindrical depression 14. Grooves 46 and 48, chamfer 50 and passage 52 provide lubricant distribution passages and serve as a reservoir therefor. A conventional grease fitting 54 is threadably connected in an aperture 56 formed in socket 8.

In order to retain the joint assembly in operative relationship, a sheet metal inverted cup-like cover 58 is disposed over the top wall 60 of housing 8. Cover 58 has an elongated aperture 62 formed therein through which the stem portion of stud 18 extends. At its outer extremity, cover 58 is provided with a circumferential radially outwardly extending flange 64 which is received in a cooperating counterbore 66 formed in housing 8. Similarly surrounding stud 18, and overlapping cover 58, is a generally frusto-conical flexible body 68 which serves to prevent entrance of foreign matter into the opening 62 at the juncture of member 58 and stud 18. At its lower terminal edge, flexible body 68 is bonded to relatively thin circular sheet metal flange 70, the lower edge of which is turned radially outwardly to overlie the flange 64 of cover 58. When assembled in the manner described, seal 68 and cover 58 are mechanically secured to housing 8 by spinning the circumferential lip 72 thereof radially inwardly.

In order to assure efficient sealing between the upper body 68 and stem of stud 18 without imposing torsional stress on the flexible body during rotation of stud 18, a nylon bearing ring 74 is bonded to the neck portion 76 of body 68. Although the stem of stud 18 closely interfits the inside diameter of ring 74, the inherent anti-friction characteristics of nylon permit stud 18 to rotate without transmitting appreciable twist to body 68.

Attention is specifically directed to the simplified construction and improved operation afforded by the phenolic truncated ball 12 of the present invention. Because ball 12 is piloted on stud end 16, it is relatively movable both with respect to socket wall 10 and stud 18. Therefore, the need for chemical or mechanical bonding to either the stud or socket is totally eliminated. In operation, ball 12 remains stationary relative to socket wall 10 when stud 18 is rotated on its own axis. Conversely, ball 12 remains stationary relative to stud 18 when the latter is tilted relative to socket 8. It will, therefore, be seen that composite motion of the stud 18 causes wear on ball 12 to be distributed proportionally between the semi-spherical outer surface 26 and the cylindrical inner surface 28 thereof. In addition, because of the abutting relationship between wall 22 of the stud flange 20 and the top wall 24 of ball 12, the latter also perform a thrust absorbing function. Although ball 12 in the illustrated embodiment takes the form of a phenol impregnated fabric body, it should be understood that numerous other plastic materials such as nylon or Teflon may also be utilized.

While but one embodiment of the invention has been shown and described, it will be evident that other changes and modifications may be made therein. It is, therefore, to be understood that it is not intended to limit the invention to the embodiment shown, but only by the scope of the claims which follow.

I claim:

1. A ball joint assembly comprising in combination, a housing formed to provide a semi-spherical socket, a truncated ball disposed in said socket having a central depression therein, said ball being provided with circumferential intersecting grooves and a radial passage extending from the point of intersection of said grooves to said depression, said grooves and passage serving in the containment and conveyance of lubricant, a stud piloted in said depression, and an apertured cover member surrounding said stud, said cover serving to retain said assembly in operating relation and being secured by means integral with said housing.

2. A ball joint assembly comprising, in combination, a housing formed to provide a semi-spherical socket, a truncated ball disposed in said socket, said ball having a central depression therein and being provided with circumferential intersecting grooves and a radial passage extending from the point of intersection of said grooves to said depression, said grooves and passage serving in the containment and conveyance of lubricant, the said depression being perpendicular to the surface deriving from the truncation of said ball, a stud piloted in said depression, a thrust transmitting surface on said stud engaging said first surface, and an apertured cover member surrounding said stud, said cover serving to retain said assembly in operating relation and being secured by means integral with said housing.

3. A ball joint assembly comprising, in combination, a housing formed to provide a semi-spherical bearing socket, a non-metallic truncated ball disposed with its rounded surface in bearing engagement with said socket, said ball having a central depression therein perpendicular to the flat portion thereof and being provided with circumferential intersecting grooves and a radial passage extending from the point of intersection of said grooves to said central depression, said grooves and passage serving in the containment and conveyance of lubricant, a stud having a stub end piloted in said depression, a flange on said stud engaging said flat portion, and a semi-spherical apertured cover member surrounding said stud and serving to retain the assembly in operating relation, said cover having a flanged periphery secured to said housing by means integral therewith.

4. A ball joint assembly comprising, in combination, a housing formed to provide a semi-spherical socket, a non-metallic truncated ball disposed in said socket, said ball having a cylindrical central depression therein perpendicular to the flat portion thereof and being provided with circumferential intersecting grooves and a radial passage extending from the point of intersection of said grooves to said central depression, said grooves and passage serving in the containment and conveyance of lubricant, a stud rotatably piloted in said depression, a thrust transmitting flange on said stud engaging the said flat portion of said ball, a semi-spherical cover member surrounding said stud and retaining said assembly in operating relation, said cover member being secured by means integral with said housing.

5. A ball joint assembly comprising, in combination, a housing formed to provide a semi-spherical socket, a member disposed in said socket having the form of a truncated ball, said member including a thrust receiving shoulder deriving from the truncation and being provided with circumferential intersecting grooves and a radial passage one end of which terminates at the point of intersection of said grooves, said grooves and passage serving in the containment and conveyance of lubricant, means forming a central cylindrical depression in said member perpendicular to said shoulder and intersecting with said passage, a stud rotatably piloted in said depression and extending out of the open end of said socket, a thrust transmitting flange on said stud engaging said shoulder, and an apertured cover member mechanically secured to said housing over the open end of said socket to retain said assembly in operating relation, the securing means for said cover member being integral with said housing.

6. A ball joint assembly comprising, in combination, a housing formed to provide a semi-spherical socket, a truncated plastic ball disposed in said socket, said ball being provided with circumferential intersecting grooves and a radial passage terminating at one end at the point of intersection of said grooves, said grooves and passage serving in the containment and conveyance of lubricant, means forming a central cylindrical internal bearing wall in said ball perpendicular to the flat portion of said ball, said passage intersecting with the chamber delineated by said wall, a stud having a stub end piloted in said bearing wall so as to permit rotation of said stud about its own axis relative to said ball, an integral flange formed on said stud axially adjacent said stud end, said flange providing an axially directed annular shoulder adapted fo rendwise engagement with the said flat portion of said ball, and an inverted cup-shaped member having an elongated aperture formed therein, said member surrounding said stud and having its outer periphery mechanically secured to said housing by means integral therewith to retain said assembly in operating relation.

References Cited in the file of this patent

UNITED STATES PATENTS

| | | |
|---|---|---|
| 2,108,814 | Flumerfelt | Feb. 22, 1938 |
| 2,553,743 | Booth | May 22, 1951 |
| 2,614,873 | Booth | Oct. 21, 1952 |
| 2,635,894 | Jackman | Apr. 21, 1953 |
| 2,648,558 | Flumerfelt | Aug. 11, 1953 |
| 2,707,645 | Moskovitz | May 3, 1955 |
| 2,733,087 | Latzen | Jan. 31, 1956 |
| 2,752,178 | Hoffman | June 26, 1956 |
| 2,755,116 | Alldredge | July 17, 1956 |
| 2,857,190 | Moskovitz | Oct. 21, 1958 |

FOREIGN PATENTS

| | | |
|---|---|---|
| 852,022 | Germany | Oct. 9, 1952 |
| 1,091,445 | France | Apr. 21, 1955 |